(12) United States Patent
Cappa et al.

(10) Patent No.: US 6,327,768 B1
(45) Date of Patent: Dec. 11, 2001

(54) METHOD FOR POSITIONING PARTS IN AN ASSEMBLY STATION

(75) Inventors: Sergio Cappa; Maurizio Ercole, both of Turin (IT)

(73) Assignee: Fata Automation S.p.A., Pianezza (IT)

(*) Notice: Subject to any disclaimer, the term of this patent is extended or adjusted under 35 U.S.C. 154(b) by 0 days.

(21) Appl. No.: 09/422,182

(22) Filed: Oct. 22, 1999

(30) Foreign Application Priority Data

Oct. 23, 1998 (IT) .............................................. MI98A2279

(51) Int. Cl.⁷ .................................................... B23Q 17/00
(52) U.S. Cl. ................. 29/407.1; 29/407.01; 29/407.05; 29/407.09; 29/714; 29/702
(58) Field of Search .............................. 29/897.2, 407.01, 29/407.05, 407.09, 407.1, 559, 702, 714, 707, 281.1, 281.5, 721; 33/568

(56) References Cited

U.S. PATENT DOCUMENTS 5,265,317 * 11/1993 Angel ...................................... 29/559
5,675,887 * 10/1997 Gajewski et al. ....................... 29/702

FOREIGN PATENT DOCUMENTS

093022186 * 11/1993 (WO) ...................................... 29/714

* cited by examiner

*Primary Examiner*—David P. Bryant
*Assistant Examiner*—Jermie E. Cozart

(57) ABSTRACT

An automated parts assembly station includes positioning means (11) having surfaces (15a, 16a) for defining a desired mutual position of the parts to be assembled and assembly means (13) connecting the parts. At some of the surfaces (15a, 16a) there are measurement means (18) for measuring a distance between the surfaces and facing surfaces of the parts being assembled. A method is provided for the timely detection of the assembly tolerances. The method includes the steps of performing with the positioning means a permanent positioning of the parts being assembled, operation of the assembly means for connecting the parts, and releasing of the positioning means. Additionally, there is a measurement of the distance between the assembled parts and some of the surfaces. This measurement includes a comparison of the measured distances with maximum admissible distances. At the end, the method generates an acceptance or non-acceptance signal depending on whether the distances measured are greater or less than the related maximum admissible distances.

5 Claims, 2 Drawing Sheets

METHOD FOR POSITIONING PARTS IN AN ASSEMBLY STATION

BACKGROUND OF THE INVENTION

The present invention relates to an automated assembly station for mechanical parts and a management method therefor.

Automated precision assembly stations comprising a structure bearing a plurality of locking inserts for mutual positioning of the parts to be assembled are well known in the prior art. Assembly devices, for example articulate robot arms, permanently fasten together the parts positioned by the inserts and the finished product is then drawn from the station.

Assembly can take place by welding, gluing, riveting, clinching et cetera depending on specific requirements. Examples of assembly stations are the welding stations on assembly lines for motor vehicles or their parts.

Usually when the assembly line of which the station is a part is made operational there is performed a fine calibration of the position of the inserts which represent ideally key reference points of the structure it is desired to assemble, that is to say points through which the structure must pass to be defined optimal. For this purpose the inserts are shaped with gripping surfaces (usually consisting of a fixed part and a facing complementary movable part) which represent the ideal configuration at those points of the object to be assembled. The surfaces of the inserts are generally shaped starting from the mathematics of the surface of the part it is desired to secure and taken from the CAD drawings representing it.

Various factors concur however to make less than ideal the configuration of the real object produced which will be subject to geometrical errors causing its deviation from the optimal configuration. Degradation factors can be proper to the assembly technique used or due to geometrical changes which intervene after initial calibration of the station. For example in the case of welding assembly variations or drifting of the welding parameters such as those due to consumption of the electrode, variation of the electrical current or welding time, change of position in the sequence of performance of the welding points et cetera can intervene. Similar factors can be traced for the other assembly methods also.

Geometrical variations can be caused for example by maintenance operations and/or adjustments to the station, wear of movable parts or even variations in the physical parameters of the parts assembled such as in the composition, thickness, shape et cetera of the parts to be assembled. Typical are the changes in thickness of pressed sheet metal parts with changes in the production lot.

For each reference point there is thus defined a tolerance range within which the object produced must fall to be accepted at least as a satisfactory part.

Usually purposive measurement stations arranged at line end perform sample measurements of the parts produced and if necessary emit an unacceptability signal which warns of the need to reject the parts in production and seek along the line the reason or reasons which produced the undesired change. The difficulty of identifying the responsible station among the plurality present in the line is apparent.

In addition, as the measurement is done on a sampling basis a certain number of defective parts are produced before the defect is signaled.

Since sequential assembly operations are generally performed on various stations before obtaining the final part which is measured on a sampling basis errors produced in an early station and which if discovered early would be correctable or limitable become irreparable and also involve members assembled in the subsequent stations.

All this results in wasted time, money and materials. The general purpose of the present invention is to overcome the above shortcomings by supplying an innovative assembly station and a management method allowing timely and accurate discovery of unacceptable deviations from the ideal form. Another purpose of the present invention is to point out in a timely manner changes in the reference geometry of the station resulting for example from faulty maintenance or wear. In addition another purpose is to facilitate recalibration of the station reference members after maintenance operations and/or worn parts replacement.

SUMMARY OF THE INVENTION

In view of these purposes it was sought to provide in accordance with the present invention an automated parts assembly station comprising positioning means having surfaces defining the desired mutual position of the parts to be assembled and assembly means connecting the parts together characterized in that opposite at least some of said surfaces there are means of measurement of the distance between said at least some surfaces and facing surfaces of the parts assembled. In such a station a method of timely detection of assembly tolerances comprises the steps of making with the positioning means a permanent positioning of the parts to be assembled, operation of the assembly means for connection of the parts, release of the positioning means to take them into a loose positioning condition of the parts, measurement with the measurement means of the distance between the assembled parts and said at least some surfaces, comparison of the measured distances with admissible maximum distances, and generation of an acceptance or non-acceptance signal depending on whether the distances measured are greater or less than the admissible maximum detected distances.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings:

BRIEF DESCRIPTION OF THE DRAWINGS

Figure 1:
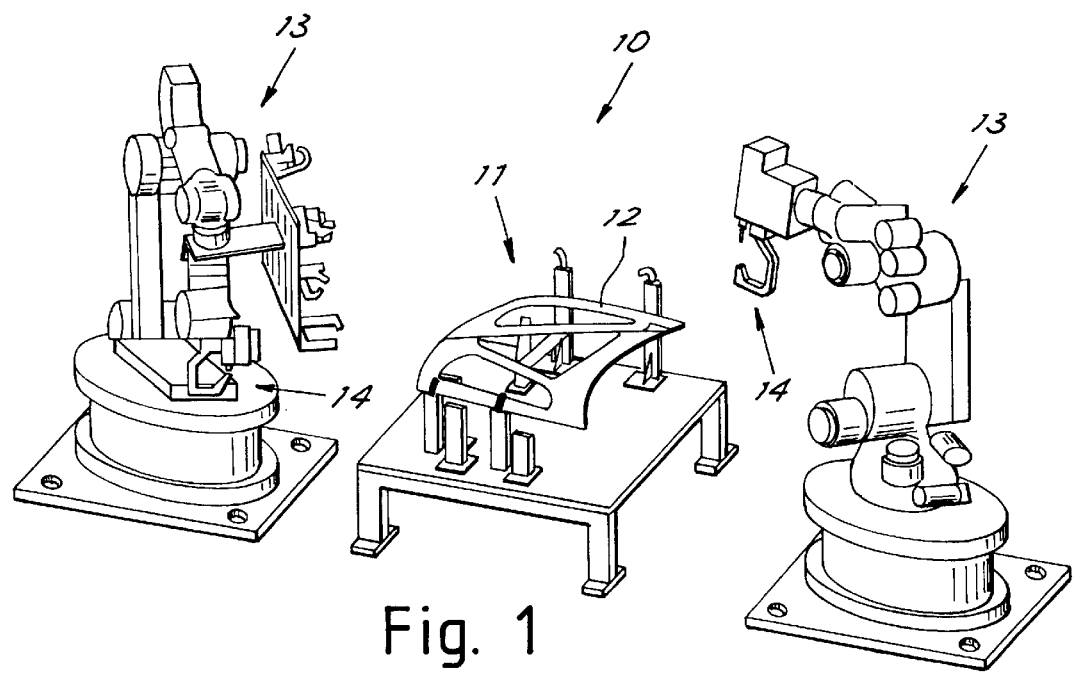
Figure 2:
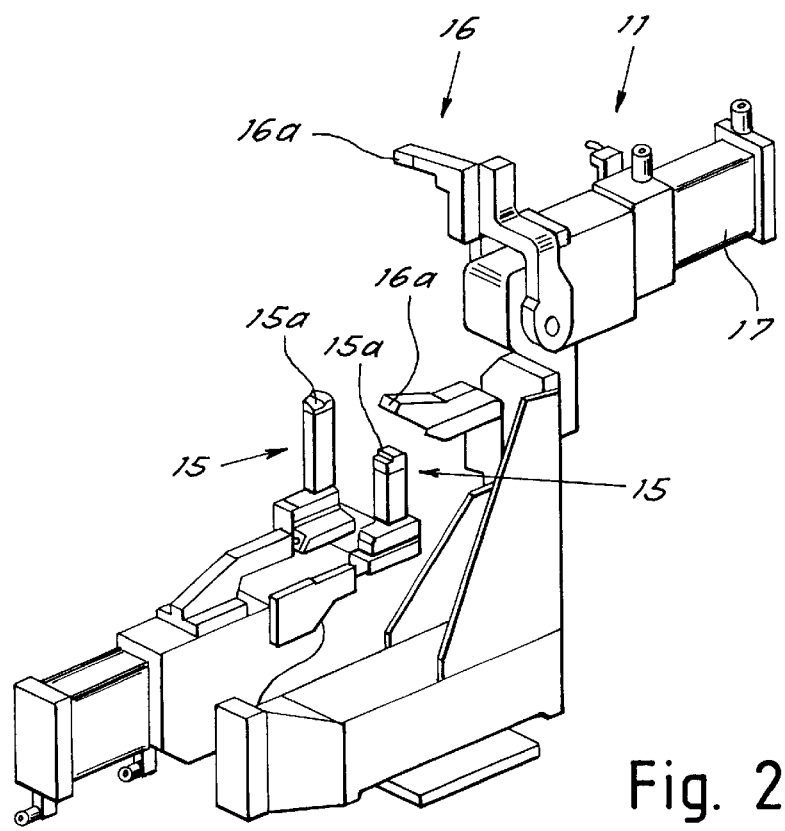
Figure 3:
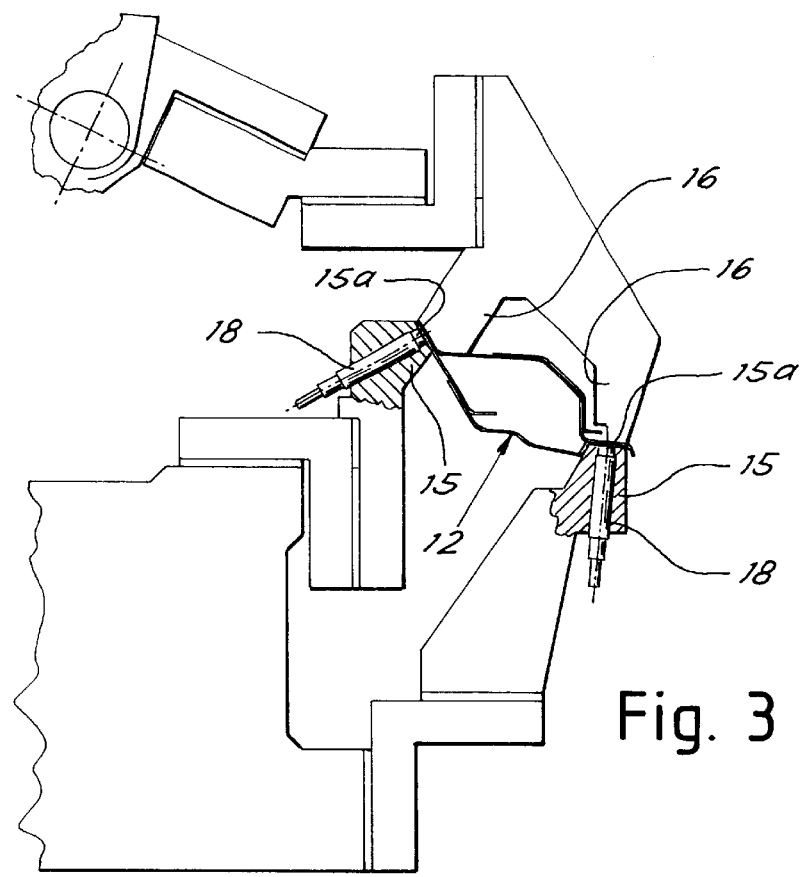
Figure 4:
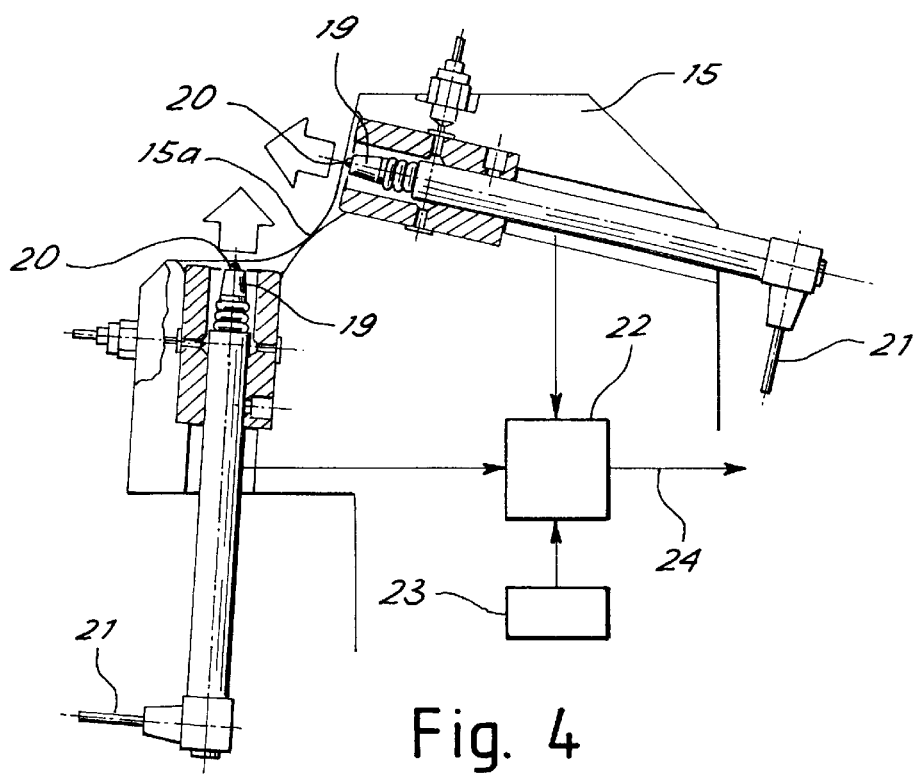

FIG. 1 shows a diagrammatic perspective view of an assembly station in accordance with the present invention, FIG. 2 shows a diagrammatic perspective view of a positioning insert located in the station of FIG. 1, FIG. 3 shows a partially cross-sectioned diagrammatic view of a detail of an insert of the type of FIG. 2, and FIG. 4 is a cross section view of a contact zone of an insert.

DESCRIPTION OF THE INVENTION

With reference to the Figures, FIG. 1 shows an automated parts assembly station indicated as a whole by reference number 10 comprising reference and positioning means 11 which define the desired mutual position of parts 12 to be assembled and assembly means 13 which connect the parts positioned by the reference means. The parts to be assembled can be for example automotive vehicle body members.

The assembly means can employ any known parts assembly system such as riveting, welding, gluing et cetera. In the Figures are shown as examples robot arms for welding with welding electrodes 14.

As may be seen in FIG. 2, the positioning means comprise inserts 15, 16 which define positioning surfaces 15a, 16a shaped on the mathematics of the parts to be produced. These surfaces define the points through which the structure being assembled must pass exactly in order to be described as optimal.

The inserts are made up of a fixed member 15 and a facing movable member 16. The movable member can be drawn on command near to the fixed member by means of an actuator 17 so as to close on a part to be assembled.

During operation of the station the parts to be assembled are held together and pushed against the positioning surfaces consisting of the fixed inserts 15 by the load applied by the movable inserts or locking members 16. If after the assembly process the assembled part adheres perfectly to the positioning surface of the fixed member 15 even after opening of the locking member 16 the assembled part is within the desired tolerances.

As may be seen diagrammatically in FIG. 3 in accordance with the present invention, at at least some of the positioning and support surfaces there are measuring means 18 for the distance between these surfaces and facing surfaces of the parts being assembled. In particular the measuring means are contained in the fixed member 15 to appear from its surface and comprise linear deviation detection sensors 18 arranged virtually perpendicular to the surface.

As may be seen in FIG. 4 in a preferred embodiment the sensors 18 are deviation detectors equipped with a measuring rod 19 which runs on command by means of a compressed air feed 21 out of the surface of the fixed member to rest with a tracer ball 20 on the facing surface. FIG. 4 shows the case of a positioning surface with complex form and equipped with two sensors while in FIG. 3 the two positioning surfaces are separated from each other and each one is equipped with its own sensor.

Naturally the number of sensors and their exact arrangement will depend on the configuration of the support surface and on the positioning errors it is desired to detect.

In using the station a stable position of the parts to be assembled is made first using the reference means 11. Then the assembly means for connection of the parts (for example by welding) are operated. Then the positioning means are released and brought into a loose positioning condition of the parts that is to say with the parts resting on the reference surfaces of the fixed inserts but free of the restrictions imposed by the movable inserts. The completed assembly can thus take on its own free configuration. At this point the measurement means are operated to measure the distance between the reference surfaces and the facing surfaces of the assembled parts. For definition of the reference surfaces, if the assembled parts touched all the reference surfaces the product obtained would be perfectly in the center of the tolerances and the distances measured would all be zero.

The distances measured are compared by a comparison device 22 with maximum admissible distanced memorized in a memory 23. The comparison device 22 generates an acceptance or non-acceptance signal 24 depending on whether the distances measured are smaller or greater than the admissible maximum distances.

In this manner assembled units which do not meet the specifications can be immediately detected and rejected. In addition the station in which the defect is found is immediately detected.

With the station in accordance with the present invention it is also possible to detect defects in parts before assembly in addition to verifying the geometry of the composite object.

In the use of the station it is also possible before operation of the assembly means to perform loose positioning of the parts to be assembled with respect to the positioning means. That is to say place the parts on the surfaces without closing the locking inserts 16 and measure with the measuring means the distance between the parts positioned and the positioning surfaces. The measured distances are then compared by the device 22 with admissible maximum distances memorized in the memory 23 and an acceptance or non-acceptance signal 24 is generated depending on whether the measured distances are smaller or greater than the related admissible maximum distances. Closing of the inserts for permanent positioning of the parts and operation of the assembly means are performed only in case of acceptance.

This avoids performance of an assembly which would give an unacceptable result. In addition in case the geometry defect is due only to some parts it is possible to recover the other parts.

Another advantage of a station in accordance with the present invention is that it is possible to detect defects in the station's positioning means. To secure this in using the station it is possible to measure with the measuring means the distance between the positioned parts and the corresponding positioning surfaces during permanent positioning of the parts and compare the distances measured with maximum admissable distances memorized in the memory 23. The device 22 then generates a conformity or non-conformity 24 for the station depending on whether the measured distances are smaller or greater than the related maximum admissible distances.

As another verification of the correctness in time of the positioning means if the fixed and movable surfaces are facing it is also possible before the pieces to be assembled reach the station to make with the measurement means a measurement of the distance between the fixed surfaces and facing movable clamping surfaces, and compare the distances measured with distances memorized previously in the memory 23 and defined as optimal distances corresponding to a perfectly efficient station. The device 22 emits a non-conformity signal 24 for the station if the result of the comparison indicates deviation of the measured distance from the memorized distance greater than a tolerance which was defined as acceptable in advance. In this manner erroneous calibration of the movable part with respect to the fixed part caused for example by poor maintenance or play produced by use is identified early. In the case of maintenance involving the movable parts of the inserts it is also possible to use the signal 24 to repeat adjustment of the movable parts with respect to the fixed parts. This makes any maintenance of the movable parts of the station much faster and easier.

To secure distances to be memorized in the memory 23 for comparison purposes it is possible to use the same measurement means of the station. To do this it is sufficient to adjust the position of the positioning means to have the surfaces thereof define an optimal position of sample parts to be assembled. Such a procedure is usually performed during installation and initial calibration of a station. The station is then commanded to move every movable member to its closing position. The measurement means are then commanded to measure the distance between the surface of the fixed member and the facing surface of the movable member. As the measurement is performed on a station determined to be efficient these measured distances are memorized in the memory 23 as optimal distances.

It is now clear that the preset purposes have been achieved by making available a station and management method permitting detection in real time of assembly defects and obtaining not only assembled members which meet precise dimensional specifications but also detect defects in the assembly station itself while providing guidance in repair and maintenance thereof.

Naturally the above description of an embodiment applying the innovative principles of the present invention is given by way of non-limiting example of said principles within the scope of the exclusive right claimed here.

For example both the form and arrangement of the positioning and assembly means and the operation sequence of the station can change depending on specific requirements. In addition the distance measurement sensors can be of any suitable type including optical, inductive, capacitative et cetera. For calibration of the station there can also be provided purposive shims to be placed between the fixed and movable parts of the inserts to identify a reference surface facing and possibly adhering to the surface of the locking insert bearing the sensor.

With a station in accordance with the present invention it is possible to verify the efficiency of the station itself merely by placing therein a sample part and then checking whether the deviation signals produced by the sensors of the station are the same as those which an efficient station should detect on that sample part unless there is a deviation considered acceptable.

In addition to verification of station efficiency the sample part can also be used for its calibration whether initial or for maintenance.

The sample part can be either a part which has been determined to be accurate that is to say a part with tolerances determined in advance as acceptable with respect to the ideal part or a part which although not acceptable has known deviations with respect to an ideal piece. In other words the sample can be either a certified acceptable sample such as the so-called 'golden part' or a part which has been measured on a known measurement station and whose deviations from the ideal—or golden—part are known. The second case has been found particularly advantageous because it allows use of a not particularly valuable part which could even be a part rejected because out of tolerance.

What is claimed is:

1. In an automated parts assembly station comprising positioning means having surfaces defining a desired mutual position of parts to be assembled and assembly means connecting the parts, at least some of said surfaces having measurement means for measuring a distance between said at least some surfaces and facing surfaces of the parts being assembled, a method for a timely detection of assembly tolerances comprises the steps of:

performing with the positioning means a permanent positioning of the parts being assembled, operating the assembly means for connecting the parts, releasing the positioning means to take said parts to a loose positioning condition of the parts, measuring with the measurement means the distance between the assembled parts and said at least some surfaces, comparing the measured distances with related maximum admissible distances, and generating an acceptance or non-acceptance signal depending on whether the distances measured are greater or less than the related maximum admissible distances.

2. The method in accordance with claim 1, comprising the additional steps of:

performing before, said assembly means operation, a loose positioning of the parts to be assembled with respect to the positioning means, measuring with the measurement means the distance between the positioned parts and said at least some surfaces, comparing the distances measured with maximum admissible distances, generating said acceptance or non-acceptance signal depending on whether the distances measured are greater or less than the related maximum admissible distances, and operating the assembly means only in case of acceptance.

3. The method in accordance with claim 1, comprising the additional steps of:

measuring with the measurement means the distance between the parts positioned and said at least some surfaces during a permanent positioning of the parts, comparing the measured distances with maximum admissible distances, generating a conformity or non-conformity signal for the station depending on whether the measured distances are greater or less than the related maximum admissible distances, depending on whether the measured distances are less or greater than the related maximum admissible distances, and enabling operation of the assembly means only in case of conformity signal being generated.

4. The method in accordance with claim 1, wherein the positioning means comprises reference inserts, each made up of a fixed member and a facing movable member with the movable member being approachable on command to the fixed member to close on a part to be assembled, the method comprising the additional steps of:

measuring with the measurement means, before the parts to be assembled reach the station, the distance between said at least some surfaces and facing movable clamping surfaces with which the positioning means are equipped, comparing the measured distances with previously memorized distances, said previously distances being defined as optimal distances, calculating deviations between said measured distances and optimal distances, and generating a conformity or non-conformity signal for the station, depending on whether the calculated deviations are less or greater than a tolerance previously determined to be acceptable.

5. The method in accordance with claim 4, comprising the additional steps of:

adjusting the position of the positioning means to have said surfaces defining the optimal position of sample parts to be assemble, shifting each movable member to its closing position, measuring, with the measurement means, the distance between the surface of the fixed members and the facing surface of the movable members, and memorizing the measured distances as the optimal distances.

* * * * *